United States Patent [19]
Jun

[11] Patent Number: 5,870,240
[45] Date of Patent: Feb. 9, 1999

[54] VIDEO CASSETTE RECORDER HAVING POSTS MOVABLE VERTICALLY

[75] Inventor: Gwang Jun, Seoul, Rep. of Korea

[73] Assignee: Daewoo Electronics Co., Ltd., Seoul, Rep. of Korea

[21] Appl. No.: 773,364

[22] Filed: Dec. 26, 1996

[30] Foreign Application Priority Data

Dec. 26, 1995 [KR] Rep. of Korea ............... 95-56868
Dec. 26, 1995 [KR] Rep. of Korea ............... 95-56876
Dec. 26, 1995 [KR] Rep. of Korea ............... 95-56877

[51] Int. Cl.⁶ ............................................. G11B 15/18
[52] U.S. Cl. ............................... 360/71; 360/77.12
[58] Field of Search ........................ 360/69, 71, 72.1, 360/72.2, 72.3, 74.3, 74.4, 77.12, 77.13, 77.14, 77.16, 78.02, 81, 83, 105, 107, 108, 109; 369/44.14

[56] References Cited

U.S. PATENT DOCUMENTS

| | | |
|---|---|---|
| 3,666,883 | 5/1972 | Yano et al. ............... 360/73.13 X |
| 4,367,499 | 1/1983 | Hoshino et al. ............ 360/74.4 X |
| 5,027,231 | 6/1991 | Fell . | 
| 5,182,739 | 1/1993 | Kime et al. ................ 369/44.14 X |

FOREIGN PATENT DOCUMENTS

| | | |
|---|---|---|
| 0403651 | 12/1990 | European Pat. Off. . |
| 4283456 | 10/1992 | Japan . |
| 8605765 | 7/1984 | WIPO . |
| 8402797 | 10/1986 | WIPO . |

Primary Examiner—Paul W. Huber
Attorney, Agent, or Firm—Anderson, Kill & Olick, P.C.

[57] ABSTRACT

A video cassette recorder comprises a pair of pole base assemblies each of which includes a guide roller for guiding a running magnetic tape to help maintain a proper contact with a head drum having at least one video head, a base and a post for supporting the guide roller, and a lever for selectively vertically moving the posts depending on operation modes. The post is mounted to the base and movable vertically, and the guide roller is rotatably fixed to top of the post. The lever is provided with a pair of stepped portions, is mounted under a deck, and horizontally moves depending on the operation modes so that the stepped portions selectively contact and move the posts by a desired height to tilt the tape between the guide rollers at an angle, thereby allowing the video head of the head drum to correctly read tracks recorded on the magnetic tape.

6 Claims, 9 Drawing Sheets

VIDEO CASSETTE RECORDER HAVING POSTS MOVABLE VERTICALLY

1. Field of the Invention

The present invention relates to a video cassette recorder ("VCR"); and, more particularly, to a VCR capable of allowing a video head to correctly read video tracks recorded on a magnetic tape during a special reproduction mode wherein the tape travels at a different speed from a standard speed.

2. Description of the Prior Art

Figure 1:
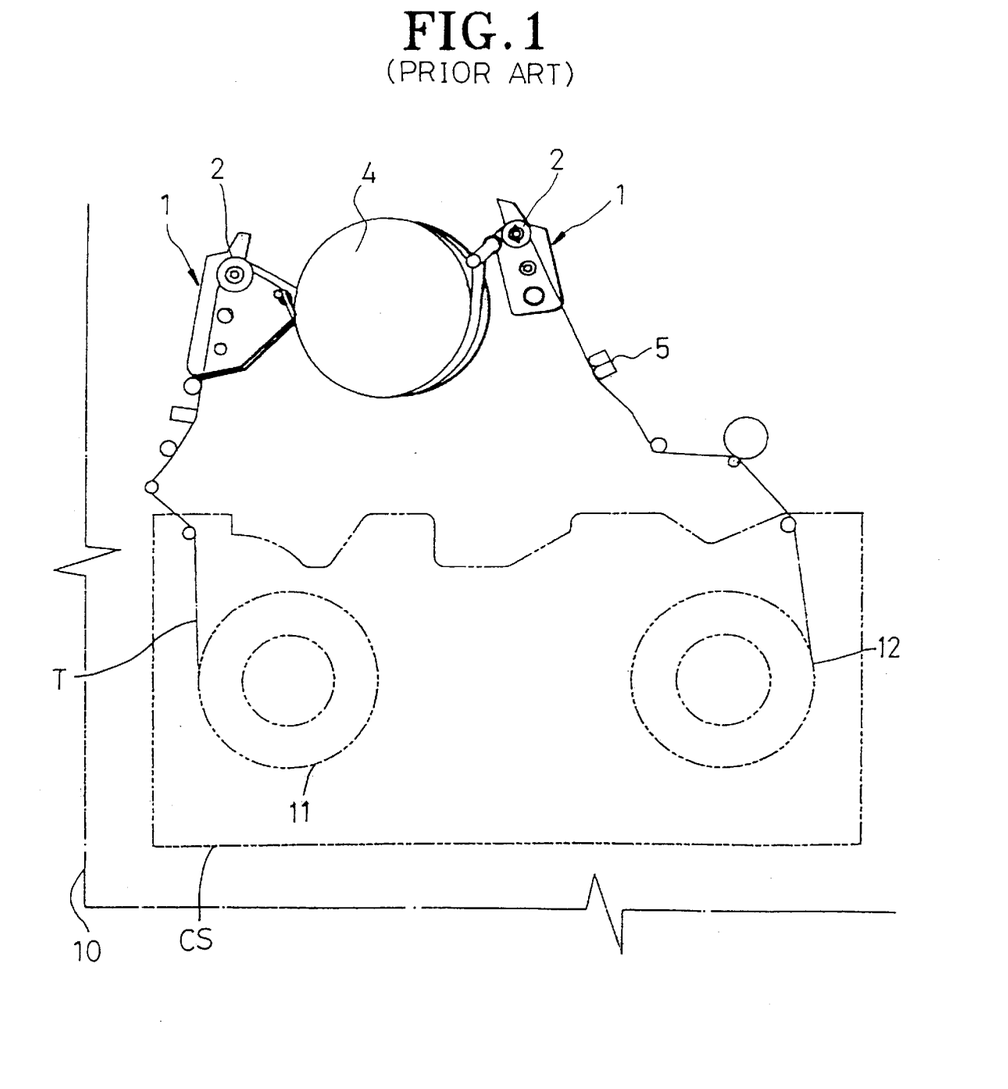
FIG. 1 shows a schematic top view of a deck of a conventional VCR.
Figure 2:
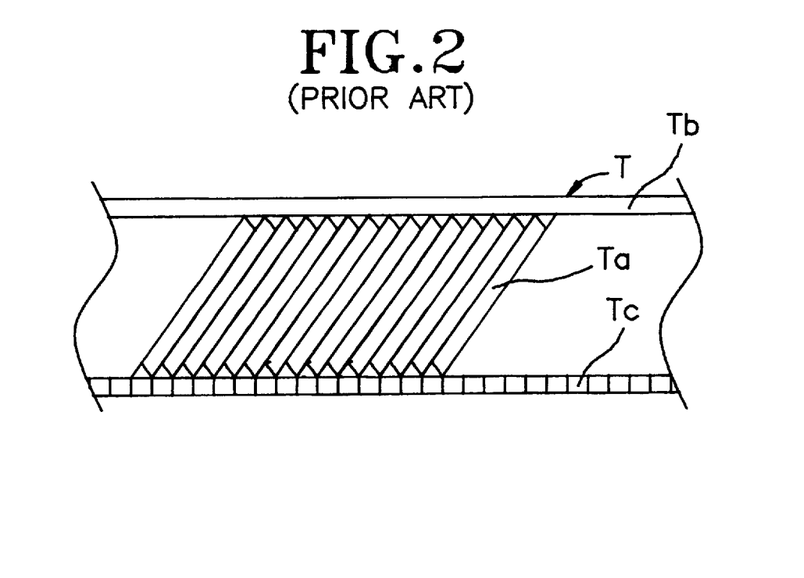
FIG. 2 illustrates a view of a magnetic tape on which video tracks, an audio track and a control track are recorded.
Figure 3:
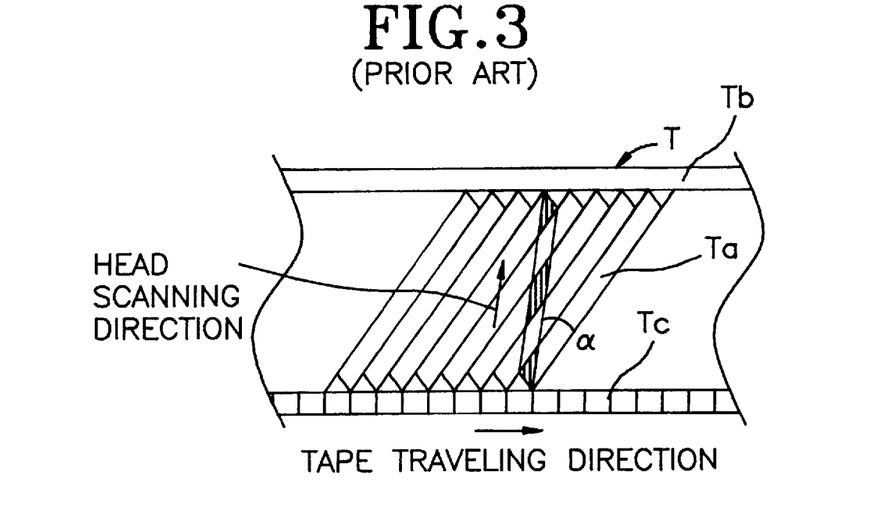
FIGS. 3 to 5 set forth views of the magnetic tape, showing various paths of a head scanning the tracks recorded on the magnetic tape during a fast forward, a fast reverse, and a still or slow reproduction modes, respectively, in the conventional VCR.
Figure 4:
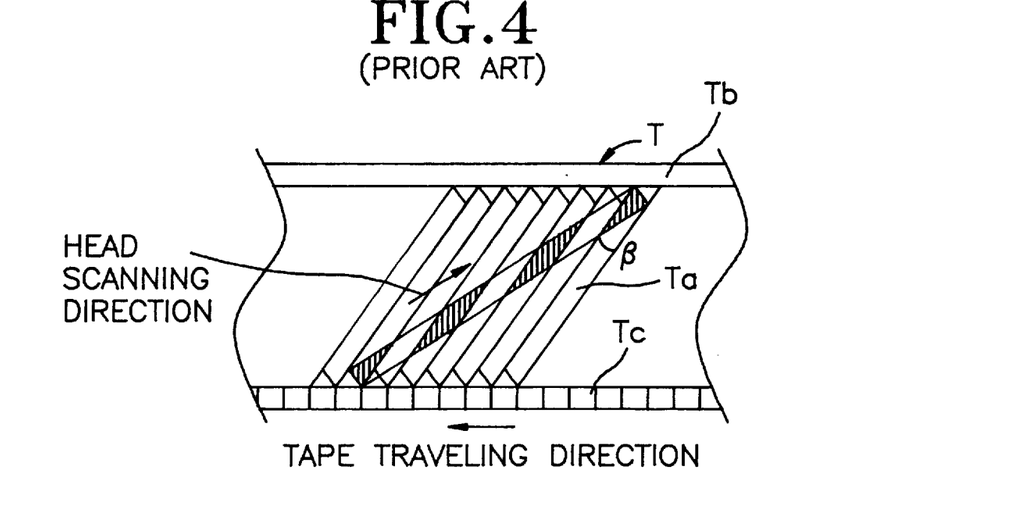
Figure 5:
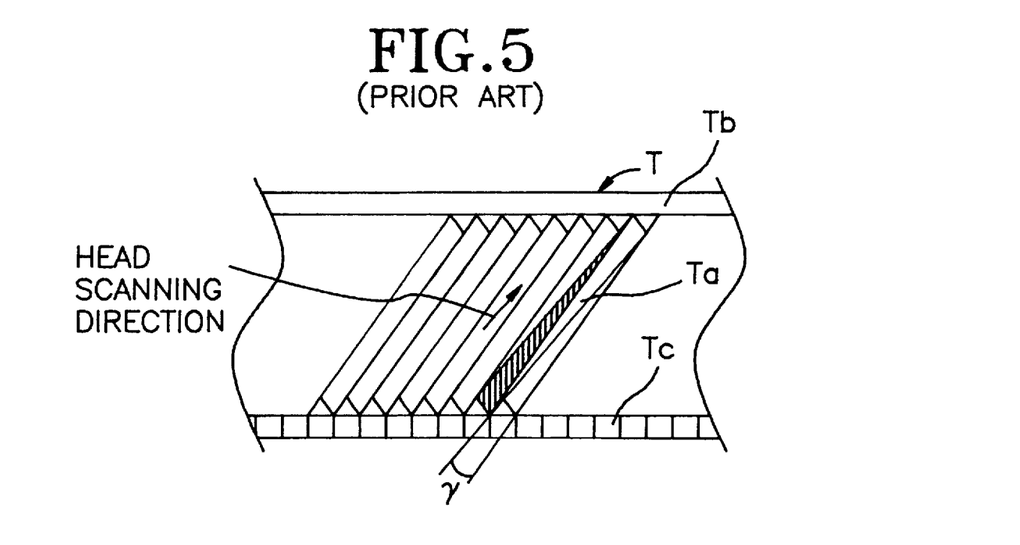

There is shown in FIG. 1 a schematic top view of a deck 10 of a conventional VCR. In the VCR, a magnetic tape T in a tape cassette CS is drawn toward a head drum 4 and disposed around a periphery thereof by a pair of pole base assemblies 1 moving along a pair of slots (not shown) on the deck 10. Each of the pole base assemblies 1 is provided with a guide roller 2 for guiding the running tape T and helping it to maintain a proper contact with the head drum 4. The tape T runs longitudinally between a supply reel 11 and a take-up reel 12, passing through an audio/control head assembly 5. Since the head drum 4 is inclined with respect to the longitudinal direction of the tape T, a pair of video heads of the drum 4 rotates at a constant speed and alternately transcribes paths, or tracks, along the tape T that are disposed at an angle relative to the longitudinal direction of the tape T. Therefore, during a recording mode wherein the tape T is transported at a predetermined standard speed, successive adjacent video tracks Ta, an audio track Tb and a control tracks Tc are formed on the tape, as shown in FIG. 2. Furthermore, during a normal reproduction mode, the tape T is transported at the standard speed, the rotating heads successively read the video tracks Ta in the order in which they were recorded, and an audio head and a control head of the audio/control head assembly 5 read the audio and the control tracks Tb, Tc, rspectively. However, during a fast forward reproduction mode wherein the tape T is transported at a speed faster than the standard speed, the rotating video heads alternately scan the video tracks Ta, forming an angle $\alpha$ with respect to a video track Ta to be read, as shown in FIG. 3; during a fast reverse reproduction mode wherein the tape is transported in a reverse direction at a speed faster than the standard speed, the video heads alternately scan the tracks, forming an angle $\beta$ with respect to a video track Ta to be read, as shown in FIG. 4; and during a still or slow reproduction mode wherein the tape is still or travels at a speed slower than the standard speed, the rotating heads alternately scan the video tracks, forming an angle $\gamma$ with respect to a video track to be read, as shown in FIG. 5. Therefore, during the special reproduction modes in the conventional VCR, as a result of the tape travelling at a different speed from the standard speed while the video heads rotate at the constant speed, there are produced noises on a screen.

SUMMARY OF THE INVENTION

It is, therefore, a primary object of the invention to provide a VCR capable of allowing a video head of a head drum to correctly read the tracks recorded on a magnetic tape during a special reproduction mode wherein the tape travels at a different speed from a standard speed, thereby reducing the noises on the screen.

In accordance with one aspect of the present invention, there is provided a video cassette recorder comprising: a pair of pole base assemblies each of which includes a guide roller for guiding a running magnetic tape to help maintain a proper contact with a head drum having at least one video head, a base and a post for supporting the guide roller, wherein the post is mounted to the base and movable vertically and the guide roller is rotatably fixed to top of the post; and means for selectively vertically moving the posts and the guide rollers depending on operation modes, thereby allowing the video head of the head drum to correctly read video tracks recorded on the magnetic tape.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENT

Figure 6:
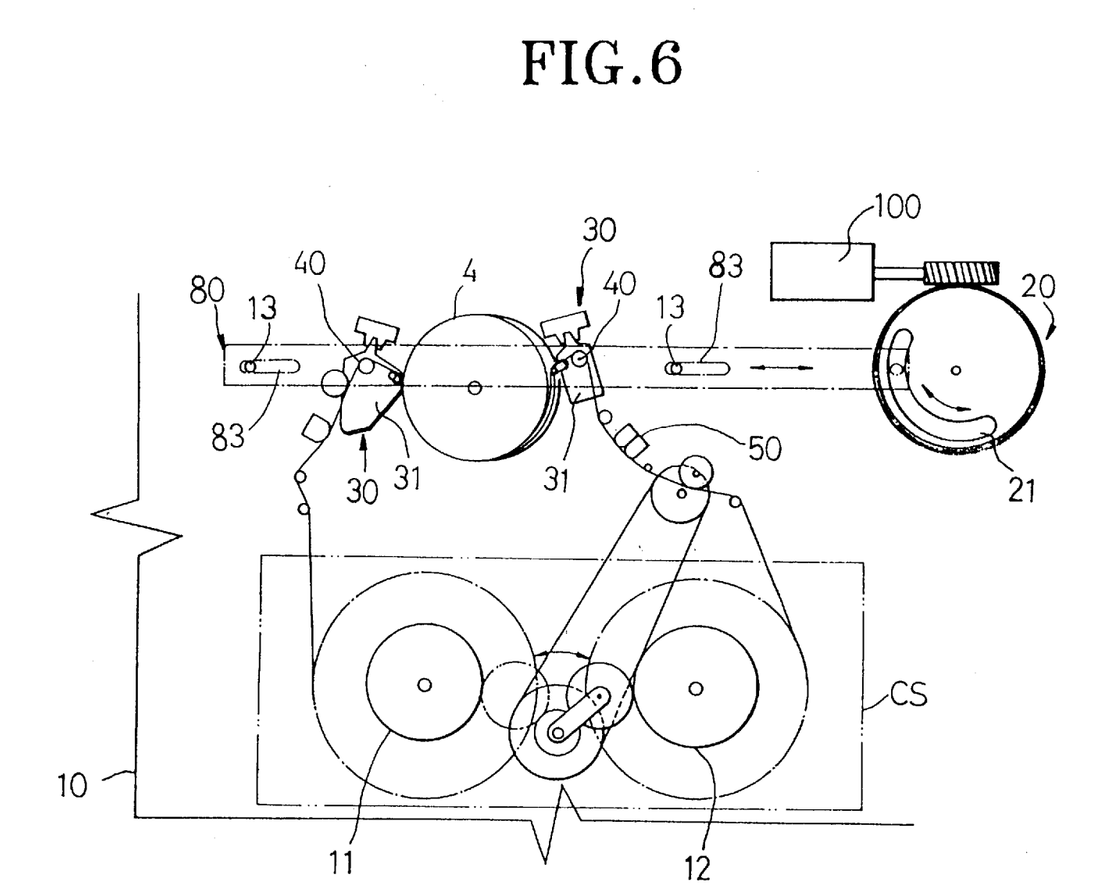
FIG. 6 shows a schematic top view of a deck of a VCR of the present invention.
Figure 7:
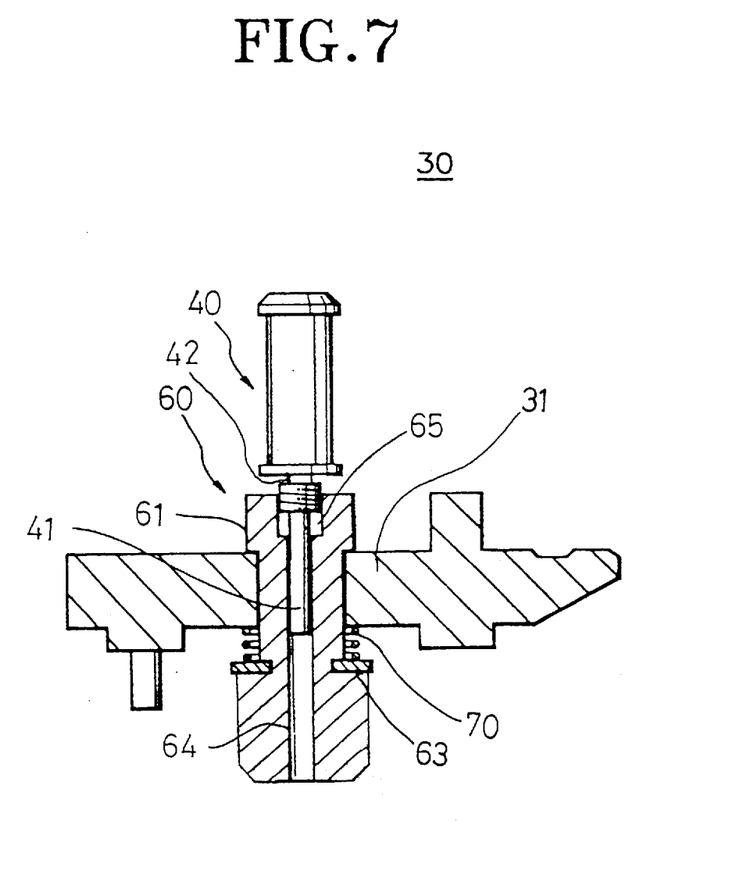
FIG. 7 represents a cross-sectional view of an inventive pole base assembly of the VCR of the present invention.
Figure 8:
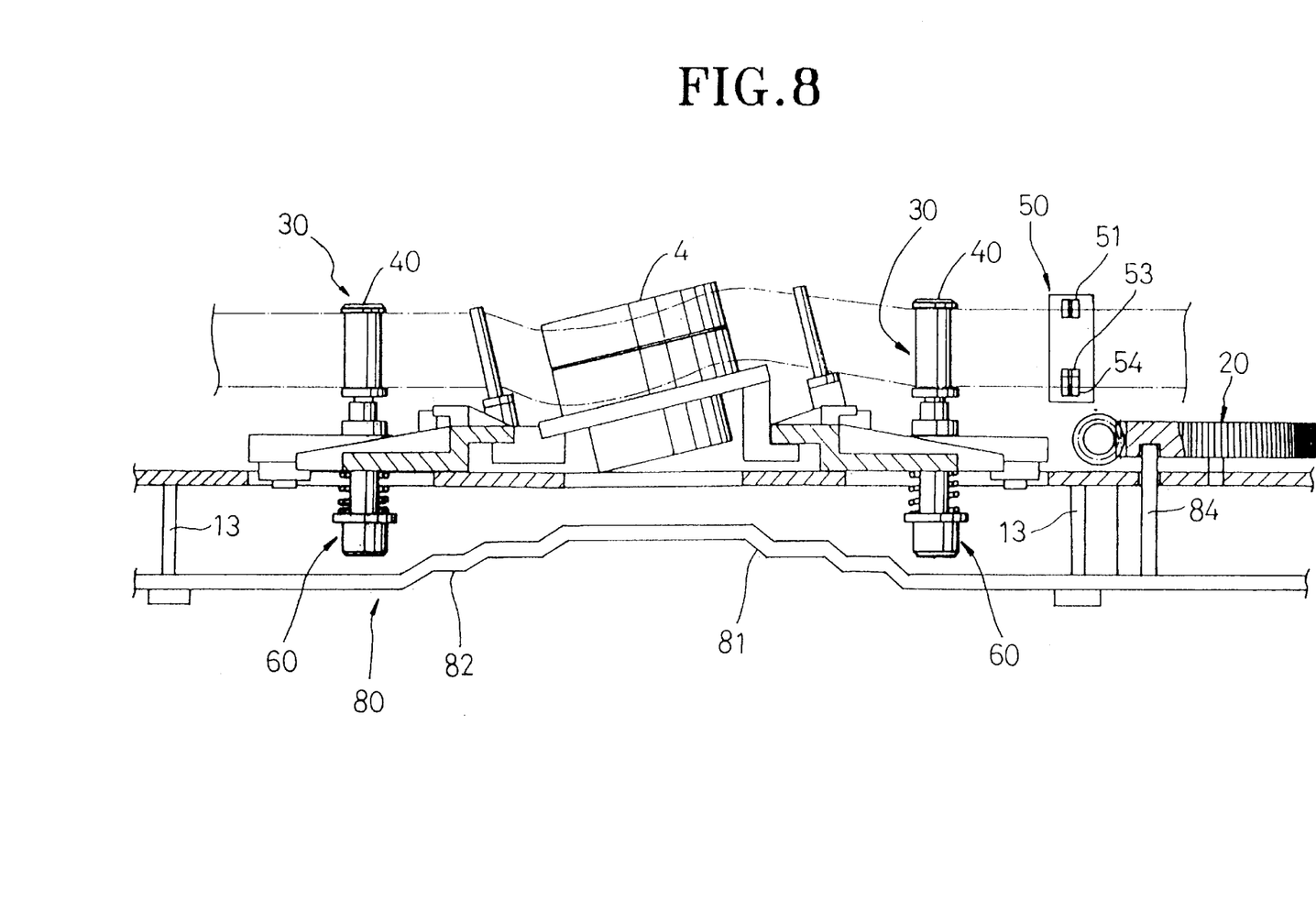
FIG. 8 represents a partial sectional view of the VCR in FIG. 6, showing the pole base assemblies and the lever.

Referring to FIGS. 6 to 8, a VCR in accordance with a preferred embodiment of the present invention comprises a pair of pole base assemblies 30, each of which includes a guide roller 40 for guiding a running magnetic tape T to help maintain a proper contact with a head drum 4 having a pair of video heads, a base 31 and a post 60 for supporting the guide roller 40; a lever 80 for selectively vertically moving the post 60 and hence the guide roller 40 depending on operation modes thereof; and an audio/control head assembly 50 having a main and a sub control heads 54, 53.

The post 60 is provided with an upper flange 61, a lower flange 63, a central hole 64 longitudinally passing therethrough and a tapped portion 65 formed at top thereof. The post 60 is mounted to the base 31 and movable vertically relative thereto. The upper and the lower flanges 61, 63 are disposed above and below the base 31, restricting the downward and upward movement of the post 60, respectively. The guide roller 40 is rotatably mounted to a shaft 41 having a screw member 42 fitted in the tapped portion 65 of the post 60. An elastic member 70 is interposed between the base 31 and the lower flange 63, biasing the post 60 downwardly and allowing the guide roller 40 to resiliently guide the running tape T.

The lever 80 is provided with first and second stepped portions 81, 82, a plurality of elongated guide holes 83 and a boss 84 disposed at one end thereof. The lever 80 is disposed under the deck 10 and held by a plurality of guide holders 13 which downwardly protrudes from a bottom surface of the deck 10 and fit through the elongated guide holes 83, respectively. The boss 84 is inserted in a trace groove 21 formed on a bottom surface of a cam 20 rotated by a driving motor 100, moving along the trace groove 21 while the cam 20 rotates depending on the operation modes so that the lever 80 is horizontally displaced and the stepped portions 81, 82 selectively vertically move the posts 60 and hence the guide roller 40 depending on the operation modes.

The audio/control head assembly 50 is disposed between the head drum 4 and a take-up reel 12, recording an audio and a control tracks on the magnetic tape T or reading the audio and the control tracks recorded thereon.

Operation of the VCR of the present invention will now be described with reference to FIGS. 3 to 11.

First, upon a loading of a tape cassette, the pole base assemblies 30 move along a pair of guide slots (not shown) on the deck 10, drawing the magnetic tape T in a tape cassette CS loaded in the VCR and bringing it into a contact with the head drum 4. At this time, the posts 60 become disposed above the lever 80, as shown in FIG. 8 and the VCR performs a normal reproduction mode wherein the tape runs at a standard speed under the above condition.

Figure 9:
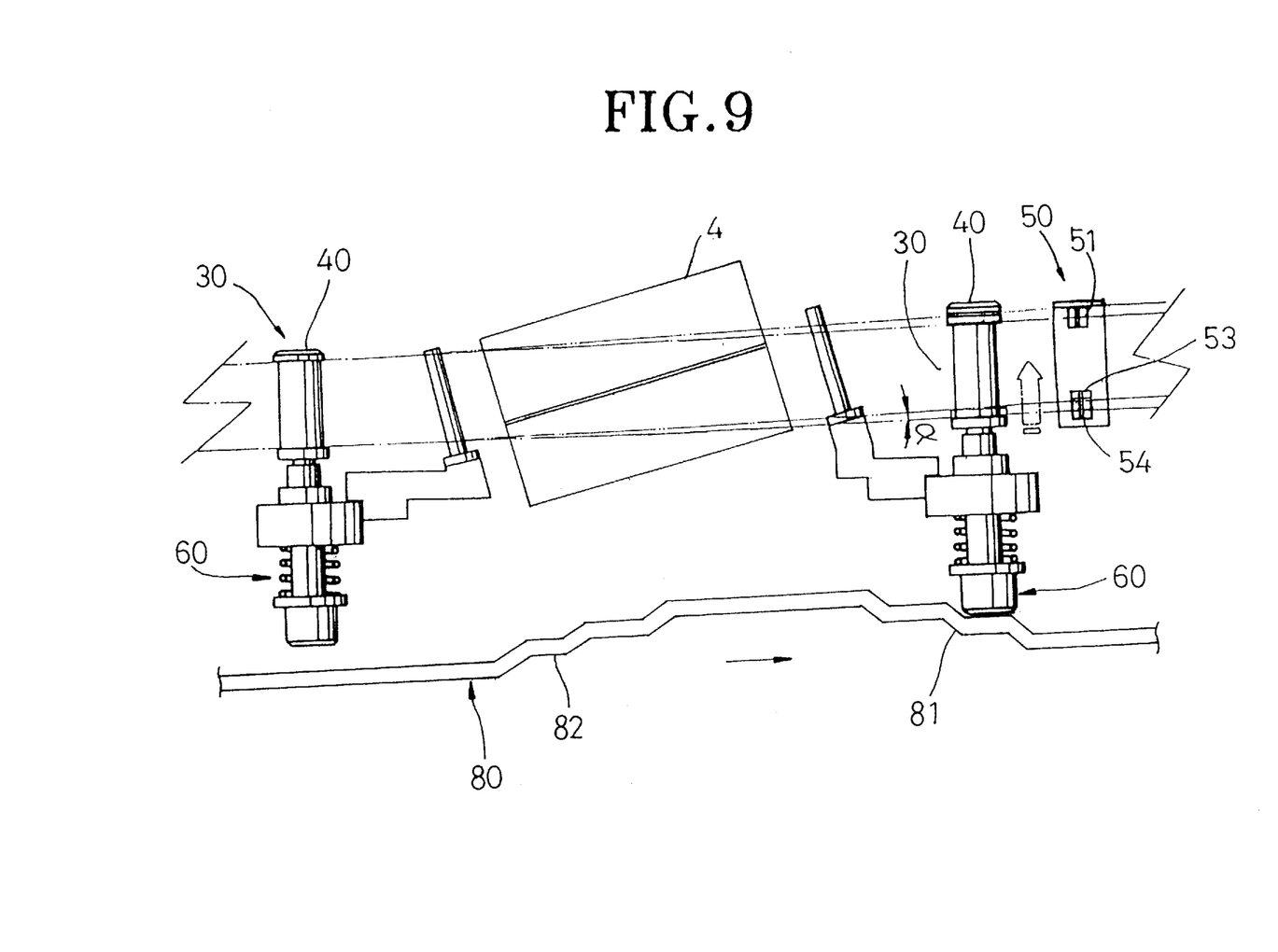
FIG. 9 represents a schematic view of the VCR in FIG. 6, showing an interaction of the pole base assemblies and the lever during a fast forward reproduction mode.

Then, upon a fast forward reproduction mode wherein the magnetic tape T travels in a forward direction at a speed faster than the standard speed, the lever is moved to the right in FIG. 8 so that, as shown in FIG. 9, the first stepped portion 81 thereof contacts and upwardly moves the right post 60 and hence the right guide roller 40 by a certain height to tilt the tape between the guide rollers 40 at an angle α (see FIG. 3), thereby allowing the video heads of the head drum 4 to correctly read the video tracks on the tape T during the fast forward reproduction mode.

Figure 10:
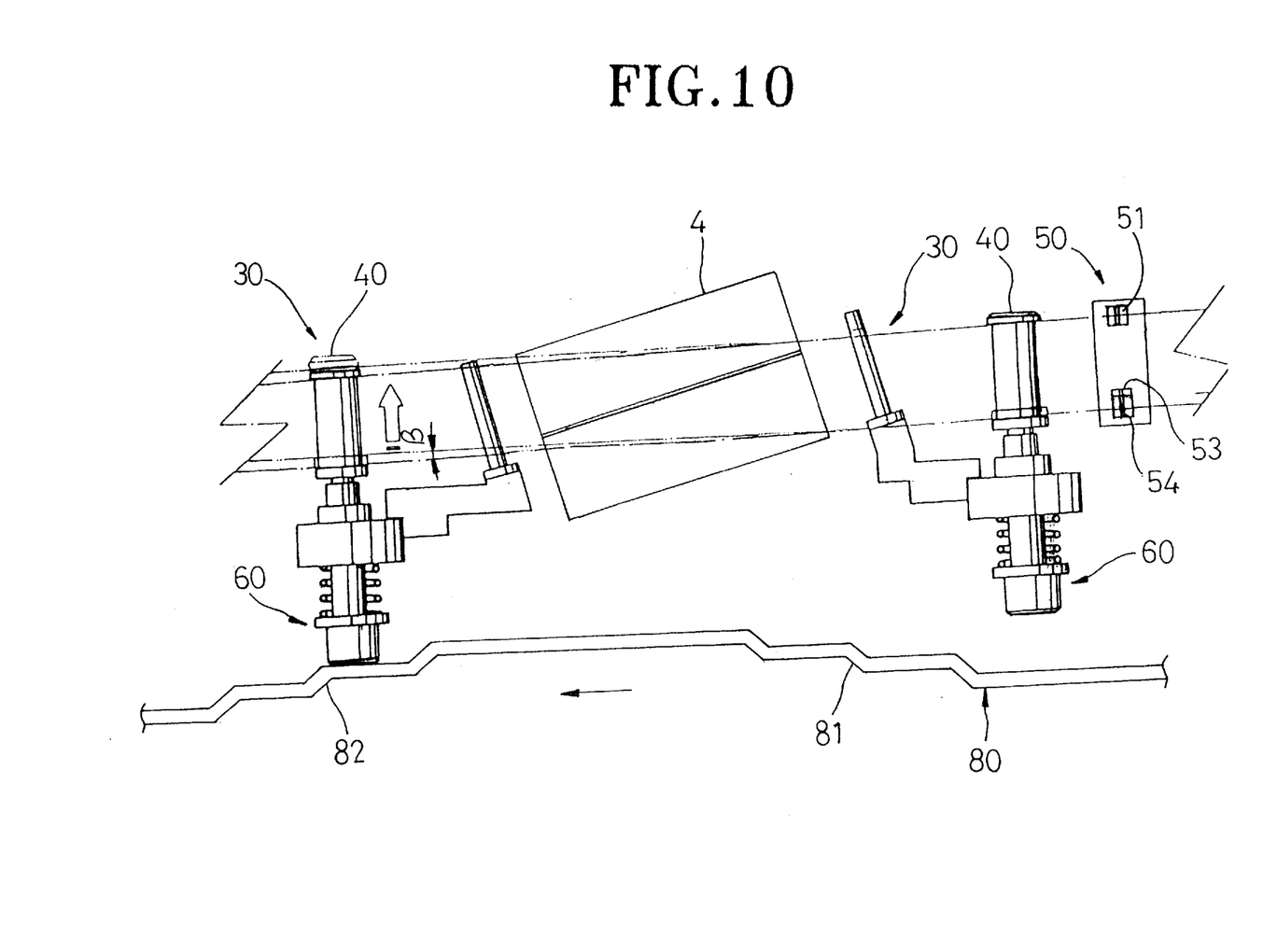
FIG. 10 represents a schematic view of the VCR in FIG. 6, showing another interaction of the pole base assemblies and the lever during a fast reverse reproduction mode.

Upon a fast reverse reproduction mode wherein the magnetic tape travels in a reverse direction at a speed faster than the standard speed, the lever is moved to the left in FIG. 8 so that, as shown in FIG. 10, the second stepped portion thereof contacts and upwardly moves the left post 60 and hence the guide roller 40 by a certain height to tilt the tape between the guide rollers 40 by an angle β (see FIG. 4), thereby allowing the video heads to correctly follow the video tracks on the tape T during the fast reverse reproduction mode.

Figure 11:
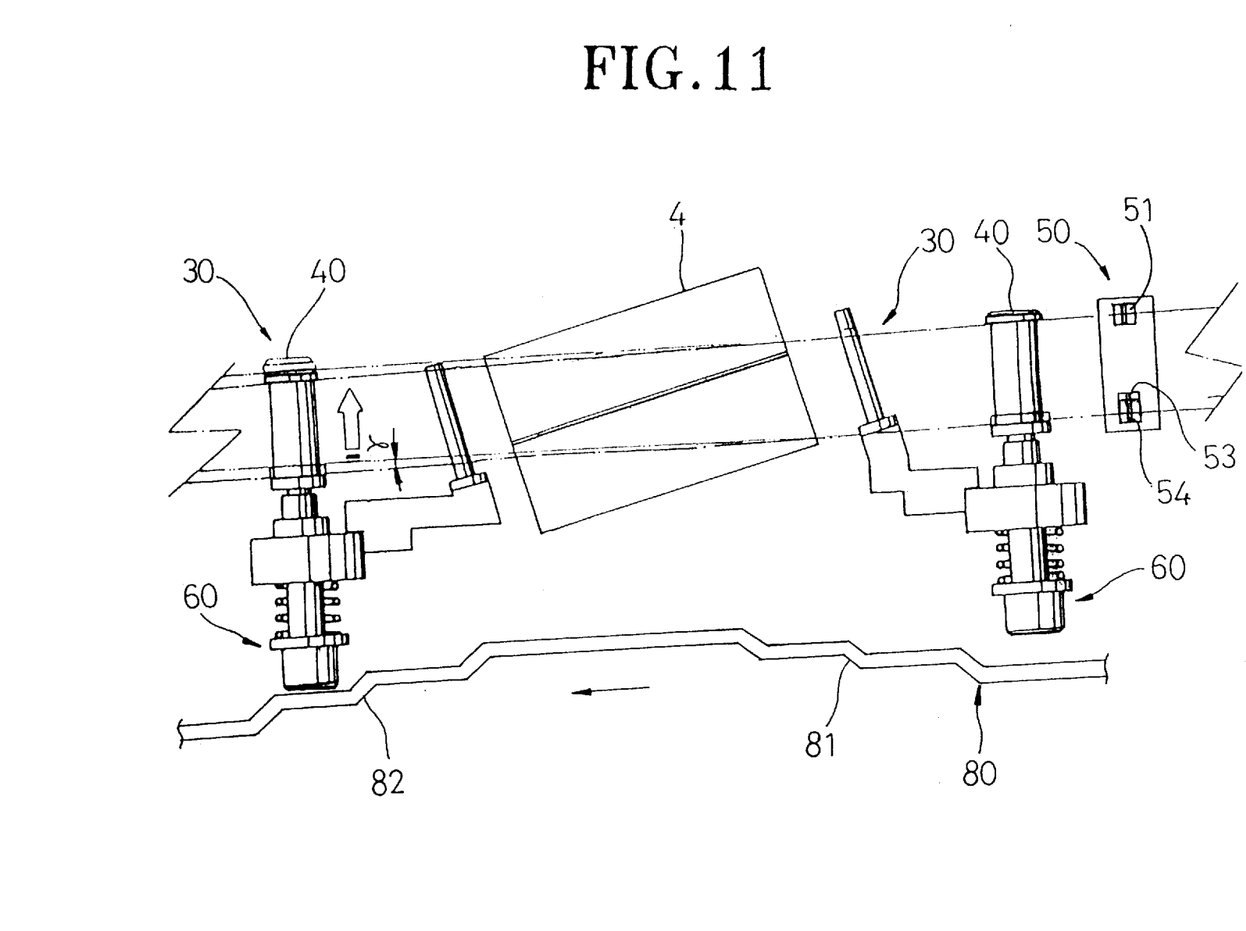
FIG. 11 represents a schematic view of the VCR in FIG. 6, showing another interaction of the pole base assemblies and the lever during a still or slow reproduction mode.

Furthermore, upon a still or slow reproduction mode wherein the magnetic tape is still or travels at a speed slower that the standard speed, the lever is moved to the left in FIG. 8 so that, as shown in FIG. 11, the second stepped portion thereof contacts and upwardly moves the left post 60 and hence the left guide rollers 40 to tilt the tape between the posts 60 by an angle γ (see FIG. 5), thereby allowing the video heads to correctly follow the video tracks on the tape T during the still or slow reproduction mode.

On the other hand, as a result of the rising of the tape passing through the audio/control head assembly 50 during the fast forward reproduction mode, the main control head 54 of the audio/control head assembly 50 may not read the control track recorded on the tape faithfully. However, the sub control head 54 disposed above the main control head 54 is activated and the main and the sub control heads 54, 53 cooperate to read the control track recorded on the tape T during the fast forward reproduction mode, thereby making it possible to faithfully read the control track even when the height of the running tape is raised. Since the sub control head 53 is deactivated during the other operation modes, it does not influence the video tracks on the tape.

As described above, according to the VCR of the present invention, even during a special reproduction mode wherein the tape travels at a different speed from the standard speed, the video heads can correctly read the video tracks recorded on the tape, thereby reducing noises on a screen.

Although the invention has been shown and described with respect to the preferred embodiments, it will be understood by those skilled in the art that various changes and modifications may be made without departing from the spirit and scope of the invention as defined in the following claims.

What is claimed is:

1. A video cassette recorder, comprising:
    a pair of pole base assemblies each of which includes a guide roller for guiding a running magnetic tape to help maintain a proper contact with a head drum having at least one video head, a base and a post for supporting the guide roller, wherein the post is mounted to the base and movable vertically and the guide roller is rotatably fixed to top of the post; and
    means for selectively vertically moving the posts and the guide rollers depending on operation modes, thereby allowing the video head of the head drum to correctly read video tracks recorded on the magnetic tape, wherein the post moving means includes a lever provided with a pair of stepped portions, the lever being mounted under a deck and horizontally moving depending on the operation modes so that the stepped portions selectively contact and move the posts to tilt the tape between the guide rollers at an angle.

2. The recorder of claim 2, wherein the lever is further provided with a plurality of elongated guide holes and a boss disposed at one end, the lever being held by a plurality of guide holders which downwardly protrudes from a bottom surface of the deck and fit through the elongated guide holes, respectively, the boss being inserted in a trace groove formed on a cam and moving along the trace groove of the cam while the cam rotates depending on the operation modes so that the lever is horizontally moved.

3. The recorder of claim 1, wherein the post is provided with an upper flange and a lower flange which are disposed above and below the base, restricting the downward and upward movement of the post, respectively.

4. The recorder of claim 3, wherein an elastic member is interposed between the base and the lower flange, biasing the post downwardly.

5. The recorder of claim 3, wherein the post is further provided with a tapped portion formed at top thereof, and the guide roller is rotatably mounted to a shaft having a screw member fitted in the tapped portion.

6. A video cassette recorder, comprising:
    a pair of pole base assemblies each of which includes a guide roller for guiding a running magnetic tape to help maintain a proper contact with a head drum having at least one video head, a base and a post for supporting the guide roller, wherein the post is mounted to the base and movable vertically and the guide roller is rotatably fixed to top of the post;
    means for selectively vertically moving the posts and the guide rollers depending on operation modes, thereby allowing the video head of the head drum to correctly read video tracks recorded on the magnetic tape; and
    an audio/control head assembly provided with a main control head and a sub control head disposed above the main control head, the main and the sub control heads being activated and cooperating to faithfully read a control track recorded on the tape during a fast forward reproduction mode.

* * * * *